United States Patent
Stelmack et al.

(10) Patent No.: US 9,654,758 B2
(45) Date of Patent: May 16, 2017

(54) SYNCHRONIZING EXTERNAL DATA TO VIDEO PLAYBACK

(71) Applicant: Microsoft Corporation, Redmond, WA (US)

(72) Inventors: Shaun Michael Stelmack, Vancouver (CA); Matthew Franklin Perzel, Vancouver (CA); Konstadinos Arvanitis, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/170,586

(22) Filed: Feb. 1, 2014

(65) Prior Publication Data

US 2014/0321826 A1    Oct. 30, 2014

Related U.S. Application Data

(60) Provisional application No. 61/816,672, filed on Apr. 26, 2013.

(51) Int. Cl.
| | | |
|---|---|---|
| *H04N 9/80* | (2006.01) |
| *H04N 9/87* | (2006.01) |
| *H04N 5/04* | (2006.01) |
| *H04N 21/2187* | (2011.01) |
| *H04N 21/43* | (2011.01) |
| *H04N 21/472* | (2011.01) |
| *H04N 21/488* | (2011.01) |
| *H04N 21/8547* | (2011.01) |

(52) U.S. Cl.
CPC .............. *H04N 9/87* (2013.01); *H04N 5/04* (2013.01); *H04N 21/2187* (2013.01); *H04N 21/4307* (2013.01); *H04N 21/47217* (2013.01); *H04N 21/488* (2013.01); *H04N 21/8547* (2013.01)

(58) Field of Classification Search
USPC .................................. 386/239–248, 326–342
See application file for complete search history.

(56) References Cited

U.S. PATENT DOCUMENTS

| | | | |
|---|---|---|---|
| 6,580,870 B1 * | 6/2003 | Kanazawa et al. ........... 386/240 |
| 2002/0035600 A1 * | 3/2002 | Ullman et al. ................ 709/203 |
| 2012/0042090 A1 * | 2/2012 | Chen ...................... H04L 65/607 |
| | | | 709/231 |
| 2013/0254346 A1 * | 9/2013 | McGowan .............. H04L 65/60 |
| | | | 709/219 |
| 2014/0173660 A1 * | 6/2014 | Correa ............. H04N 21/25866 |
| | | | 725/42 |
| 2014/0267931 A1 * | 9/2014 | Gilson ................. H04N 5/4403 |
| | | | 348/734 |

\* cited by examiner

*Primary Examiner* — Hung Dang

(57) ABSTRACT

The subject disclosure is generally directed towards synchronizing live streaming videos with additional sources of contextually-related data. In one or more aspects, contextually-related data is marked with a timestamp, with a reference to each piece of data maintained in a manifest. The manifest is accessed to locate the contextually relevant information (e.g., on a companion device or the video playing device) in synchronization with the streaming video, such that a user is able to pause/stop/rewind/fast forward while maintaining the timeline synchronization between video and the data.

20 Claims, 7 Drawing Sheets

SYNCHRONIZING EXTERNAL DATA TO VIDEO PLAYBACK

CROSS-REFERENCE TO RELATED APPLICATION

The present application claims priority to U.S. provisional patent application Ser. No. 61/816,672, filed Apr. 26, 2013.

BACKGROUND

Maintaining synchronization between live streaming videos and additional sources of contextually-related data (e.g., on a companion device) has a number of issues; (note that what is a "live" broadcast can vary from provider to provider, e.g., there are different delays experienced by viewers having different broadcasters). One issue arises in that the user may want to pause/stop/rewind/fast forward, yet maintain the timeline synchronization between video and data.

For example, consider a viewer watching the live video of a professional martial arts-type/ultimate fighting event on a display driven by a gaming console or other entertainment device. The console or other entertainment device is capable of presenting statistical data about the event, e.g., from an external source that is separate from the video feed. However, as the viewer pauses, stops, rewinds and fast forwards so that the video is no longer live, the statistical data needs to be presented to the viewer in such a way that it does not give away even a hint as to the outcome, as doing so may ruin/spoil the experience for the viewer.

It is also desirable to link and synchronize the display of interactive input. This needs to be done in a way that allows different types of users to effectively have the same experience, that is, the experience may be the same for users viewing the "head" of the feed as well as users who joined the stream late and as a result are watching a delayed live stream.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards outputting data in synchronization with a outputting a video stream, in which the video stream and data are received from external sources that are separate from one another. This may include determining a location within the video stream, sending a request based on the location for information corresponding to the data, and receiving the information comprising the data or a reference to the data.

In one or more implementations, a data service obtains event-related data that is generated in conjunction with streaming video of an event, stamps the event-related data with a synchronization marker, and outputs synchronization-marked data that corresponds to the event-related data for access. A data encoding service communicates with the data service to obtain information corresponding to the event-related data and maintain a manifest based upon the information. The data encoding service also returns at least part of the manifest in response to a request for manifest content, in which the manifest content provides information by which the synchronization-marked data is accessible for use in synchronizing with streamed video content based upon one or more synchronization markers in the synchronization-marked data.

One or more aspects are directed towards synchronizing event-related data from one source with streaming video from another source, including marking the event-related data with synchronization markers that correspond to locations in the streaming video. Metadata that identifies the event-related data is provided to a consumer, which facilitates access to the event-related data marked with synchronization markers based upon information in the metadata.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards combining streaming video that may be received in real time/near real time with separate, external data (e.g., contextually related data) in a way that maintains synchronization between the video feed and the external data. In one or more aspects, this includes linking live events to a video timeline in real time in a way that allows the synchronization to be maintained regardless of where in the video stream a user is currently viewing the video in (non-real) time, e.g., as a result of each viewer's pause/stop/rewind/fast forward operations.

The external data such as in the form of text (although graphics, animations and/or additional video may be generated from the data, as well as active data such as obtained via interactive fan voting) may be superimposed over the video stream, or output alongside, underneath, in a picture-in-picture type output and so forth. Further, the external data may be presented on a companion device, such as a smartphone, table, personal computer and/or the like that a viewer possesses along with the video playing device (e.g., gaming console) that is presenting the streaming video feed. For purposes of explanation, a single companion device is generally described herein, although it is understood that the data may be output on multiple companion devices and/or on the same display that is showing the streaming video feed.

It should be understood that any of the examples herein are non-limiting. For instance, while a gaming console is used in some examples, any computing device, such as a tablet, handheld device, smartphone, laptop computer, desktop computer and so on may be used with the technology described herein. Indeed, the use of a companion device along with a primary device is facilitated in one or more examples. In one aspect, the technology described herein may be based around the functionality on a gaming console (e.g., Xbox One™) application. The application functionality may be supported by various external services and inputs as exemplified herein. There are also operating modes that are based upon the feature needs of an application, such as demonstrated by fan voting examples, and a companion device (e.g., based upon SmartGlass™-related technology) experience. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computers and video and data output in general.

Figure 1:
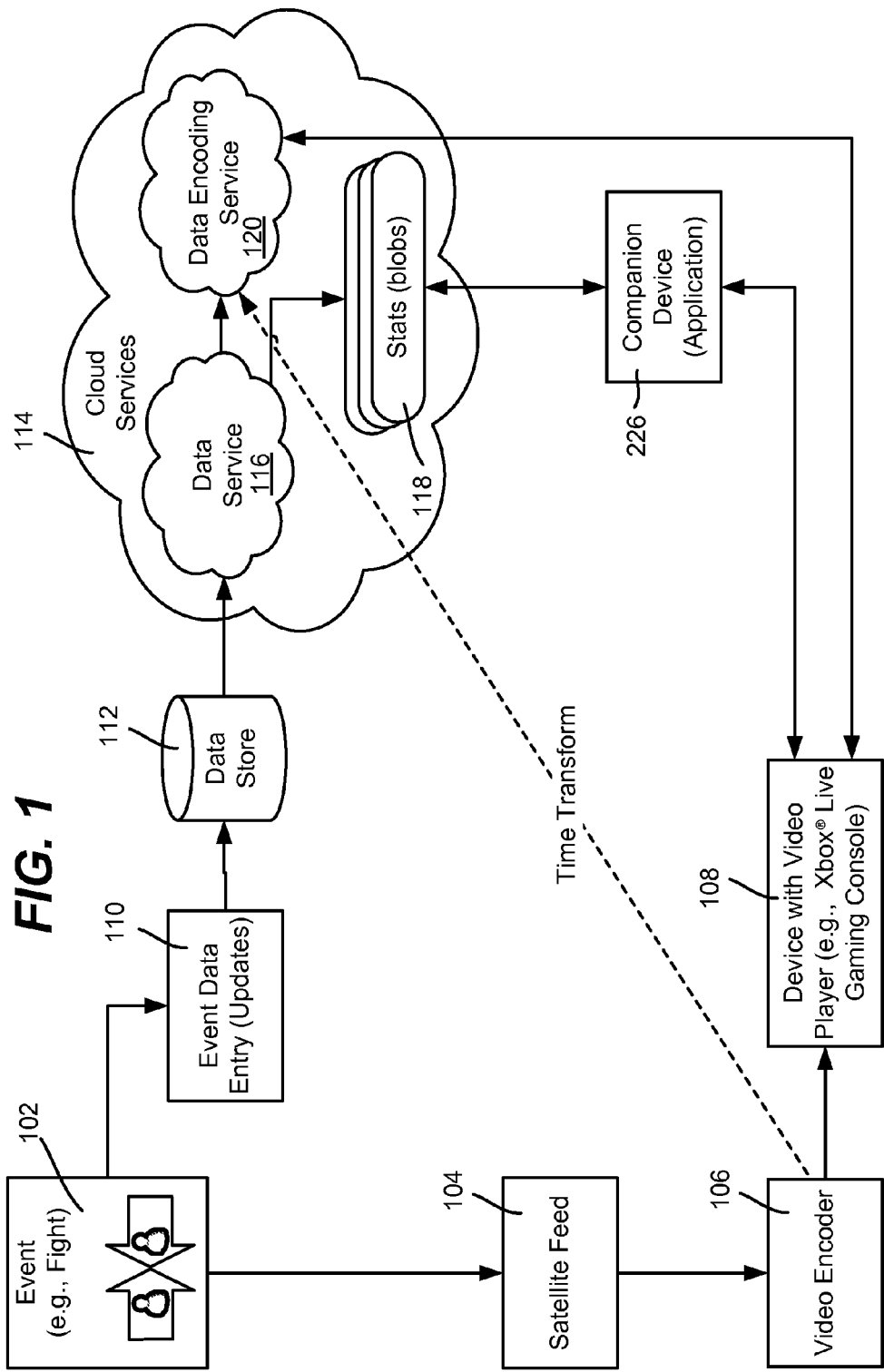
FIG. 1 is a block diagram including components configured to synchronize data obtained from one source with streaming video obtained from a different source according to one or more example embodiments.

FIG. 1 is a block diagram generally showing example components of one or more implementations. An event 102 (e.g., one typical scenario is a live sporting event) results in video in the form of a satellite feed 104 or the like being provided to an encoder 106. The encoder 106 provides encoded video to authorized viewers, e.g., on a device 108 having a video player for outputting the video, which is exemplified as a gaming console in this example.

The video encoder 106 encodes the video that it receives from the broadcast satellite (or other source) into an appropriate video format (e.g., one such format is based upon Smooth Streaming). This process also includes the start time (a reference time controlled by the system) of when the live video has begun encoding, as part of the video stream that the client receives (via a video manifest 326, FIG. 3). The encoding and decoding may use any suitable technology, and are not described hereinafter, except to reiterate that some video start identifier (e.g., the start time) is available to the system to determine from where synchronization with the external data begins.

On the data side, certain events such as sports events, which in one example is a professional fight, have external data generated therewith such as statistics related to the event. For example, in a fight scenario, such external data may be a tally of the number of punches thrown in a round and/or in total thus far by each contestant. In general, this data is produced by an external provider, e.g., experts viewing the event in real time, typically assisted by computer programs or the like. Such data may be entered sporadically, such as every few seconds while the event is ongoing; during timeouts when no action is occurring there may not be any data, or there may be compilations of older data pushed, such as totals thus far, for example.

The provider thus pushes data updates 110 as they are entered in real time into a data store 112, which may be consumed by a component (of cloud services 114 in this example). In one or more implementations, a cloud services component referred to in FIG. 1 as (e.g., fight) data service 116 obtains a copy of this data (e.g., via a pull/database query for example), timestamps the data, and writes out the data into a cloud storage blob 118 to be downloaded by a consumer (e.g., application program) at an appropriate time. Note that instead of a timestamp, any correlating information may be used as a synchronization marker, e.g., the data may be associated with a frame counter or the like, as one possible alternative.

The data service 116 component also sends a message to a data encoding service 120 with the relevant details of the data, (e.g., blob URL, event ID, fight ID in a fight scenario, internal timing, and so forth). At this point, any time transformations (FIG. 2) also may be provided to ensure that the synchronization between the video stream 222 and external data is as close as possible. For purposes of brevity, the external data is shown as a data feed 224; note that this is generally a feed, regardless of whether pushed to a data store and pulled therefrom, or however obtained.

With respect to time transformation, there may be a time lag in transmission/uploading the data feed relative to the video stream, such as due to transmission delays, and/or database writing and reading. Time transformations may be used to account for such differences. Note that because of satellite transmission delay, encoding and decoding delays and the like, a viewer of the streaming video watching the video "live" actually sees the video with some time lag, on the order of twenty or more seconds. Thus, any small delay in event data entry and uploading/processing/downloading is easily compensated for, whereby a user sees the event without any undesirable difference between the data (e.g., statistics) and the actual video.

Figure 2:
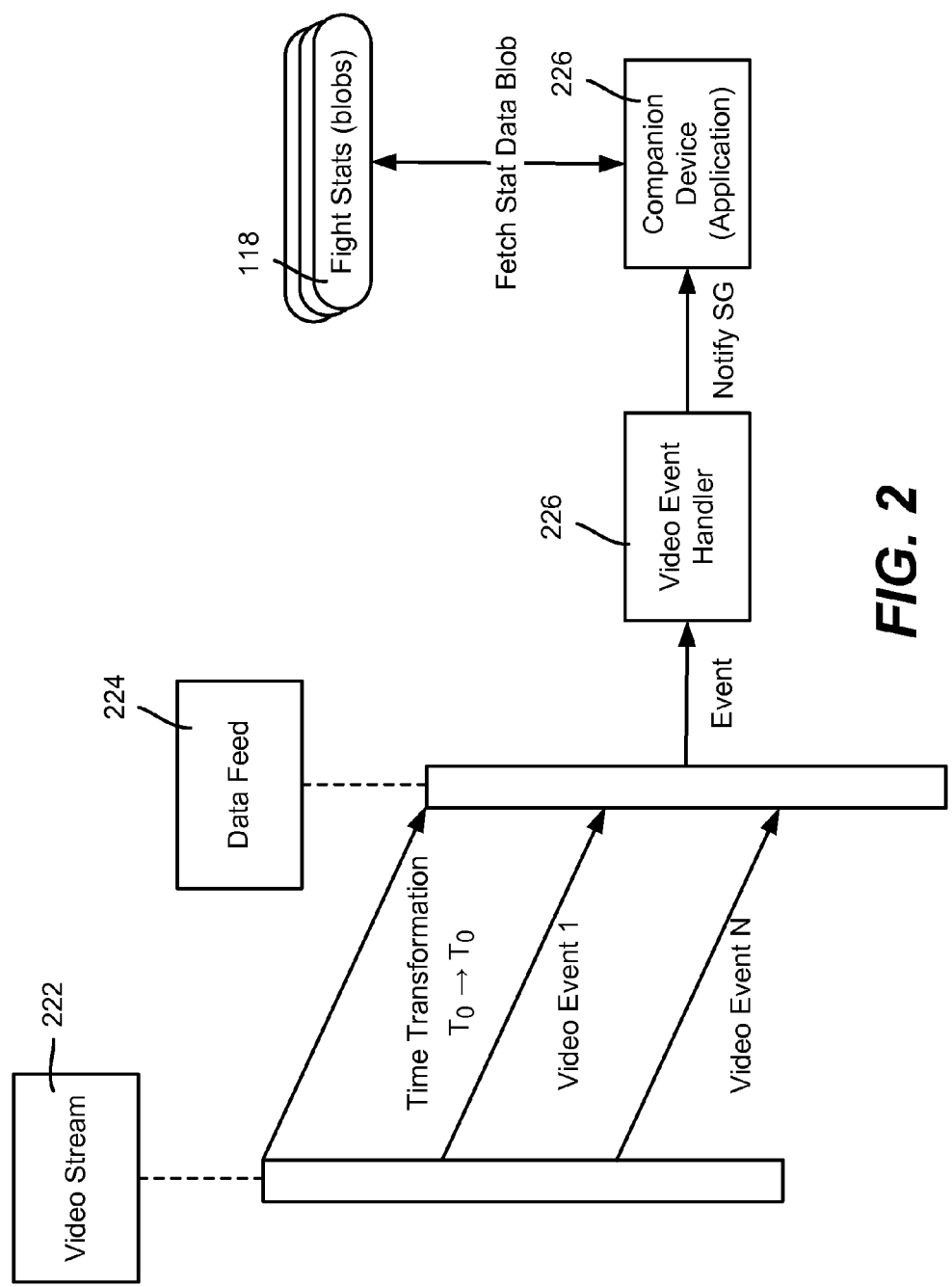
FIG. 2 is a representation of time transformations that may be used in synchronizing data and video, according to one or more example embodiments.

As described herein, a video event handler component 226, such as part of feature logic 332 (FIGS. 3 and 4) of the device 108 processes the data events for output. In the example of FIG. 2, the events are output to a companion device application 226. As described herein, the companion device application 226 outputs the data in a suitable format; (as mentioned above, this is only one example way of outputting of the data).

By way of an example, consider synchronized fight statistics for a live "fight" event currently taking place somewhere in the world. At the event there is a broadcasting crew that is filming/capturing the event for live feeds to be played over television, the internet, and other video-capable devices. At this event there is also a group of people, typically not part of the same organization that provides the streams, who provide detailed information about what is taking place (in a fight example, data reflecting punches thrown, takedowns, and so forth). This information is entered into a system as the event data 110 (FIG. 1), providing a data service 116 that is separate from the live video streams.

To be highly desirable to users, the technology described herein (e.g., for providing synchronized fight statistics) allows a user to join a live video and receive the statistics or other data up to that point in the video, even data the user has not previously seen. Similarly, a user may change the location in a video by rewinding, fast-forwarding, and so forth, and view the data corresponding to that time. For example, if ten punches are thrown at time X in the fight, and the user starts at time X or fast-forwards/rewinds to time X, the accompanying statistics will show ten punches thrown at that time.

To accomplish the synchronization, the broadcast-related data is accompanied by a manifest for that video (or set of videos). The system maintains a current state of the statistical information in each new chunk of the data manifest for that video (or videos). By way of example, in one or more implementations, every twenty seconds of video may be associated with a chunk in the manifest. Notwithstanding, it is understood that the chunk size/duration is arbitrary, and technically it is possible to return the entire manifest if desired. However at present, due to practical limitations on hardware (e.g., CPU) and service levels (e.g., bandwidth) in many environments, it is typically advantageous to break the data up into smaller pieces, that is, the chunks.

Figure 3:
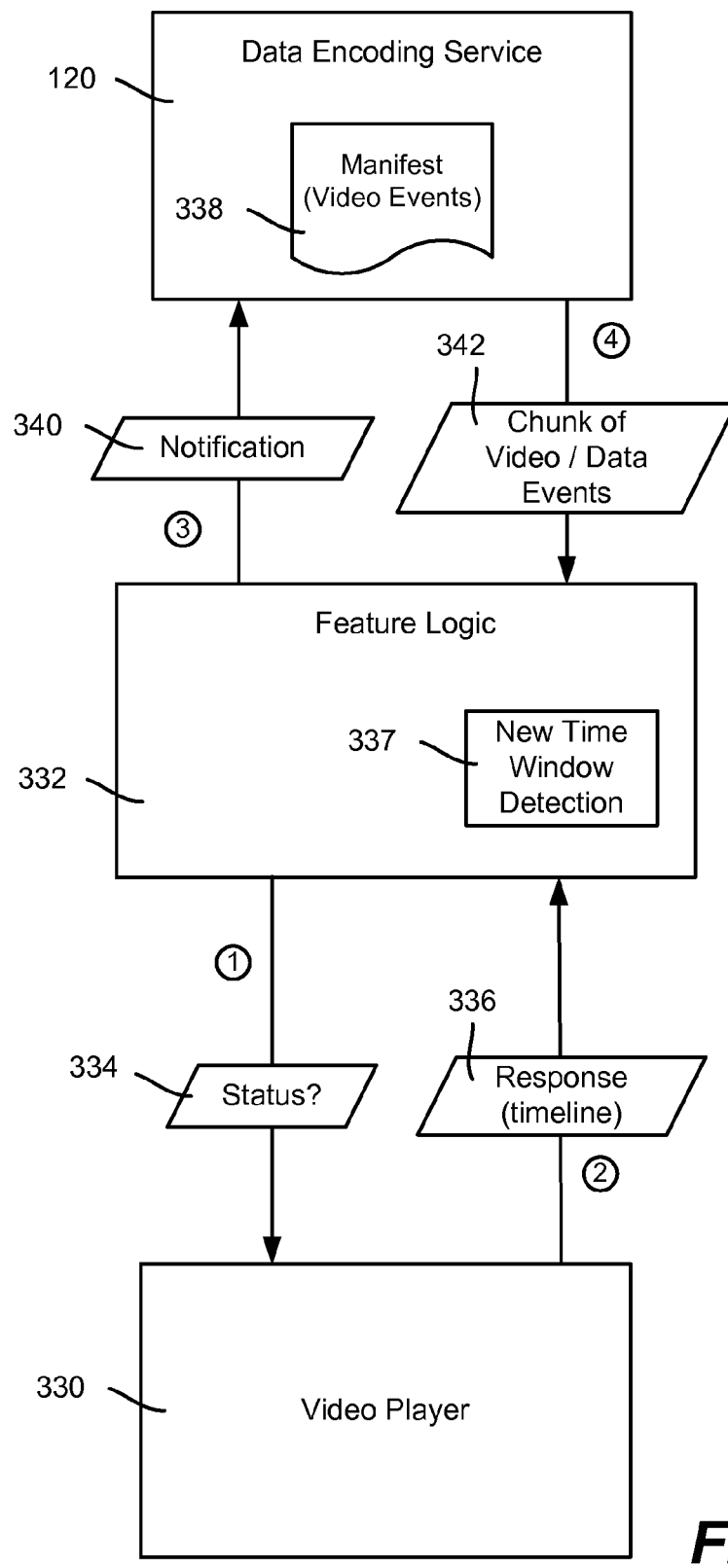
FIG. 3 is a representation of obtaining metadata used in synchronizing event-related data and with video of an event, according to one or more example embodiments.

Turning to FIG. 3, in one or more implementations, in a gaming console application (or set of applications), there is a component comprising a video player 330 and a component comprising feature logic 332, which may be made up of other components to form application logic. When a user starts to play a video, the feature logic 332 requests the status 334 of the video from the video player 330 (e.g., via a querying operation) to determine what the current timeline of the video stream is, which the video player 330 returns in a response 336. The status 334 request and response 336 also correspond to the arrows labeled one (1) and two (2) in FIG. 3. The feature logic 332 continues to send requests and receive responses on an update interval, (e.g., every 100 ms the feature logic 332 checks the video status).

In general, when the feature logic 332 has decided that a video event has occurred, the feature logic 332 sends a notification through the rest of the application, which gets handled by specific components depending on what type of event it is and what data it contains. When the feature logic 332 has detected that the video timeline has entered into a new time window (as defined by the synchronization-related technology described herein), represented in FIG. 3 via new time window detection component 337, a notification 340 (arrow three (3)) is issued and a new chunk of content in the data manifest 340 is requested from the data encoding service 120. The chunk comprises video/data events 342 (the arrow four (4)). In this way, the video-related data events 342 are added to the feature logic 332 to check when the feature logic component 332 does its video status update.

Figure 4:
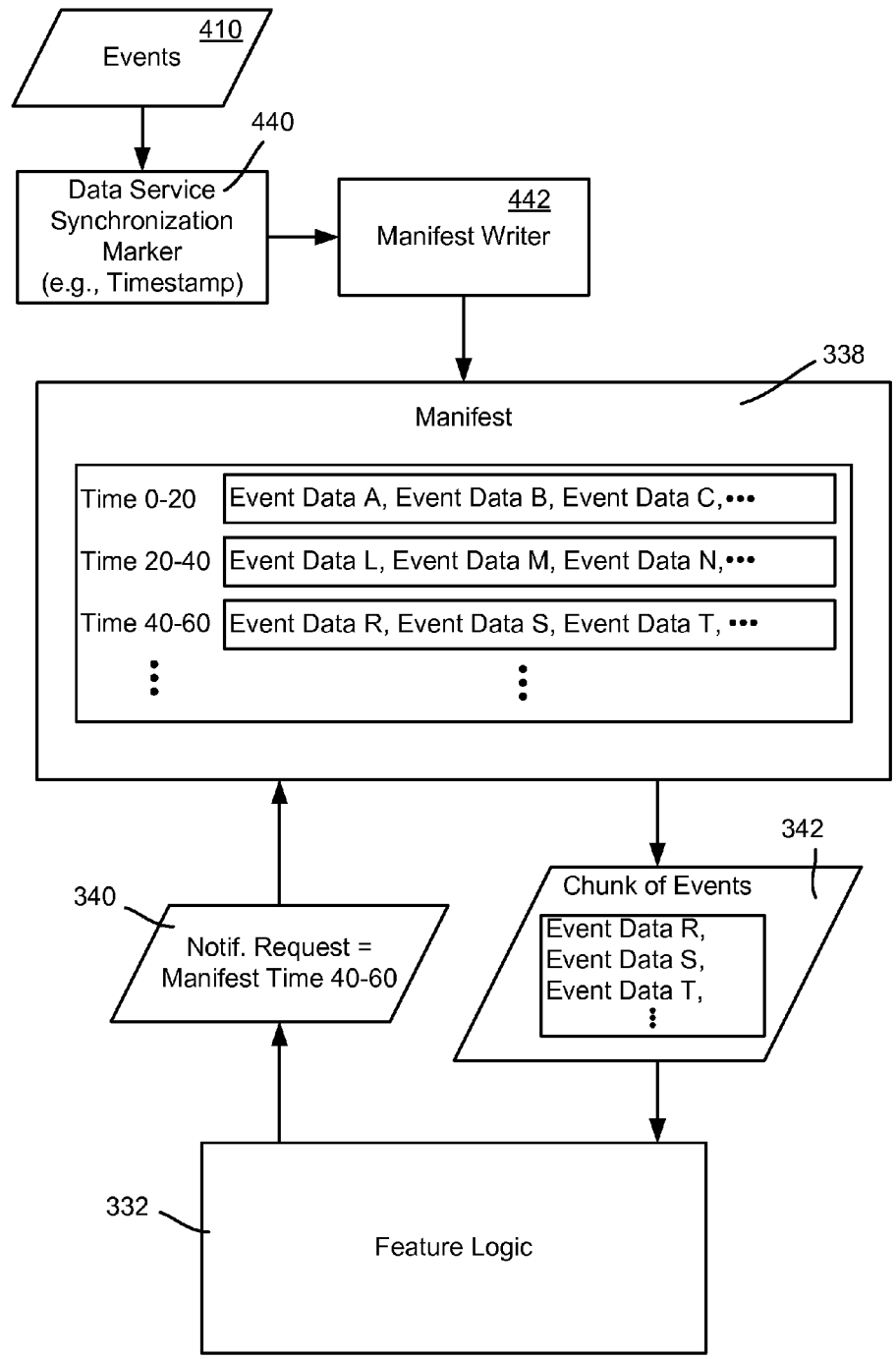
FIG. 4 a representation of a manifest of metadata and obtaining part of the manifest for use in synchronizing event-related data and with video of an event, according to one or more example embodiments.

As generally represented in FIG. 4, in one or more implementations, the data manifest 338 is a file or other data structure that contains a list of data/video events keyed off of the video time, e.g., metadata that relates the events to the video location; (as used herein, "location" with respect to the video comprises any identifier that differentiates different points in the streaming video from one another, which may be a time value, a "frame" counter and so on). As described above with reference to FIG. 1, these events 410 are synchronization-marked (e.g., timestamped) by a component 440 of the data service 116 and provided to the data encoding service 120 via a notification where they are written (block 442) into the manifest 338. The various event data (e.g., blob URL, event ID, fight ID in a fight scenario, internal timing and so forth) may be grouped by time intervals into the chunks, e.g., each twenty seconds, for providing to a consumer (e.g., the feature logic 332) upon request.

In this way, when a user joins the video, a first manifest chunk (or alternatively set of chunks) that the user receives has the latest statistics (or a reference thereto) relative to that point. As used herein, this mode of operation is referred to as continuous mode. Note that the entire manifest may be received rather than chunks thereof, in which event receiving and processing separate portions of the manifest are not needed; (however in many scenarios chunks are used, and thus chunks generally will be described hereinafter). To this end, on a video player (e.g., in the gaming console application), enough information is provided to use the reference time plus the duration of where the user is in the video to know which chunk of manifest content to request from the cloud. Once the data has been downloaded, the data contains a list of events for the current chunk as well as any current state events (e.g., continuous messages), with each event containing a time code, e.g., with millisecond granularity. In this way, although a chunk corresponds to a relatively large chunk of time, e.g., twenty seconds, each event may be synchronized to within a millisecond of the video to which it is associated.

Turning to additional details of one example implementation, a data encoding service (FIG. 1) was set up to be an agnostic service (that is, not tied to any specific feature or secondary service, or even to a type of video) that receives requests to add a video event to a specific video at a specific time in the video. Supported videos have a unique identifier that is known to services and clients when requesting information about a video. When a video event request is made to the service, a broadcast message is created that in one embodiment contains the following data:

```
{
    "Encoder": "Poll",
    "VideoGuid": "9a126d99-0f20-4851-a822-9431a64925e4",
    "MessageGuid": "9a40490e-97c1-4044-8d20-369f4d96e87e",
    "EntryGuid": "098cf107-b314-4f95-a4d0-972ab43b5bf1",
    "MessageTime": "2013-01-22T00:01:05",
    "MessageAction": 0,
    "Data": {
    },
    "MessageIndex": 7,
    "MaxMessageIndex": 12
},
```

The message format may be the same for all types of video events, with bits that change depending on the type of content being broadcast, such as the "Encoder" parameter, and the "Data" parameter. The application decides how to process them.

Once this time has passed, the event is triggered and processed by the gaming console client. Depending on the type of message (e.g., a fight data event), the gaming console notifies any attached companion devices with the URL(s) to the blobs that are relevant to the current video time. For example, one type of companion device that provides contextually relevant information to live streaming video being played on a primary device may be based upon SmartGlass™ technology; e.g., play-by-play information on SmartGlass™ may be synchronized to the gaming console video.

On the video player (e.g., in the gaming console application), enough information is provided to use the reference time plus the duration of where the user is in the video to know which chunk of data to request from the cloud. Once the data has been downloaded, the data contains a list of events for the current chunk as well as any current state events (e.g., continuous messages), with each event containing a time code, e.g., with millisecond granularity. Once this time has passed, the event is triggered and processed by the gaming console client. Depending on the type of message (e.g., a fight data event), the gaming console notifies any attached companion devices with the URL(s) to the blobs that are relevant to the current video time. The companion devices then fetch this data, process it, and display it on the device screen for the user to see.

In one or more implementations, the data in the data store 112 may be maintained separately from the video stream, instead of permanently interleaving the data into the video stream, (which is one feasible alternative). Maintaining the data provides a number of benefits, including that the data may be modifiable, selectable, interactive and so forth.

For example, consider that the data initially contained an error. The data may be modified to correct that error, whereby any download of the data thereafter no longer contains the error. Thus, data errors such as misspellings, data changes due to rulings (e.g., a referee determines later that a takedown did not count) and so forth may be corrected. The data remains synchronized, so later users get the benefit of such error corrections. Further, the saved data may be processed and presented to viewers in new ways, e.g., a new statistic or total may be generated from original data that was not available at the initial viewing time. Note that while in general it is desirable to present the data to delayed viewers as if they were watching the event live, such enhancements/corrections may be even more desirable in certain circumstances.

In addition to data provided by statisticians or the like viewing the event live, other data may be provided, including by viewers. For example, online social networking and microblogging services allow users to provide comments and the like as an event is ongoing. Such data may be maintained in conjunction with the video, synchronized with the corresponding time, for reading by viewers, for example. Such data may be interactive. For example, a viewer may interactively view whatever comments he or she desires, including with filtering by sender name or topic; (in contrast, such comments shown during live television are generally selected by a television editor or the like and simply scroll below the main display).

Figure 5:
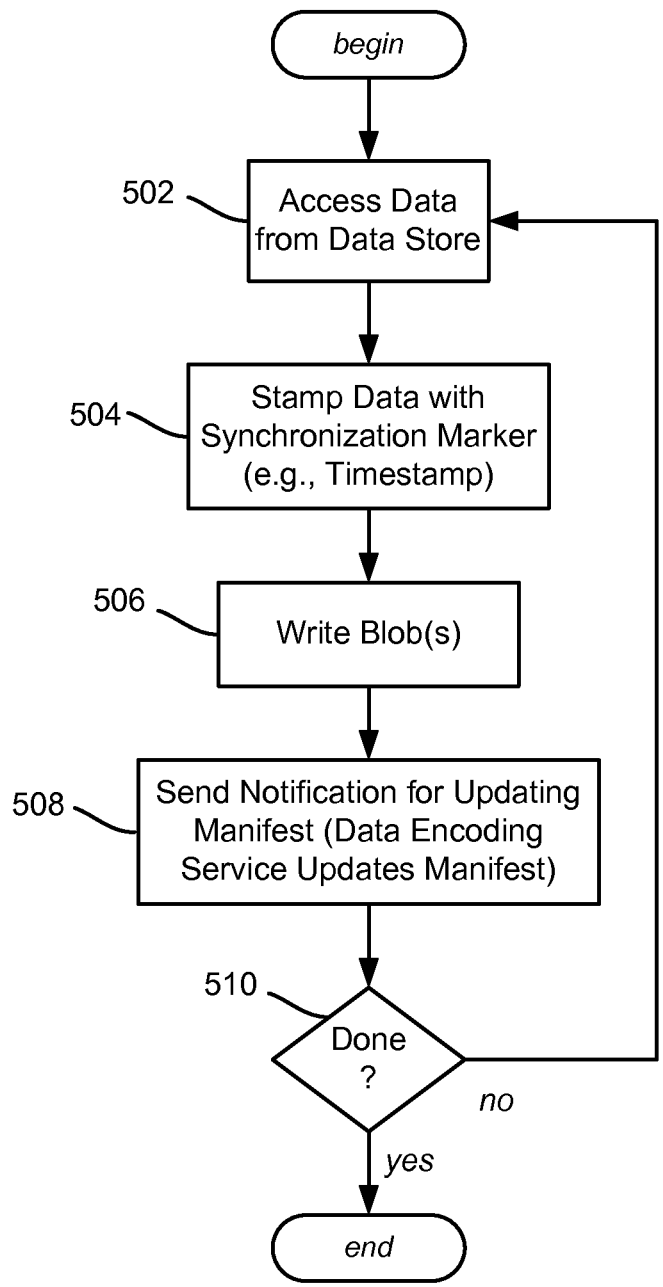
FIG. 5 is a flow diagram representing example steps that may be taken to process data for video stream synchronization, according to one or more example embodiments.

By way of summary, FIG. 5 shows example steps of a flow diagram generally directed towards synchronizing the data feed with the video stream, beginning at step 510 where the (e.g., pushed) data is read from the data store by the data service. Step 504 stamps the data with the timestamp or other synchronization marker, which may include any time transformations. Step 506 writes the data blobs that will be accessed (e.g., by the video player device and/or companion device application(s)) to obtain the data.

Step 508 sends the notification to the data encoding service, which updates the manifest. The process repeats via step 510 until the video feed is done, e.g., at the end of the broadcast event.

Figure 6:
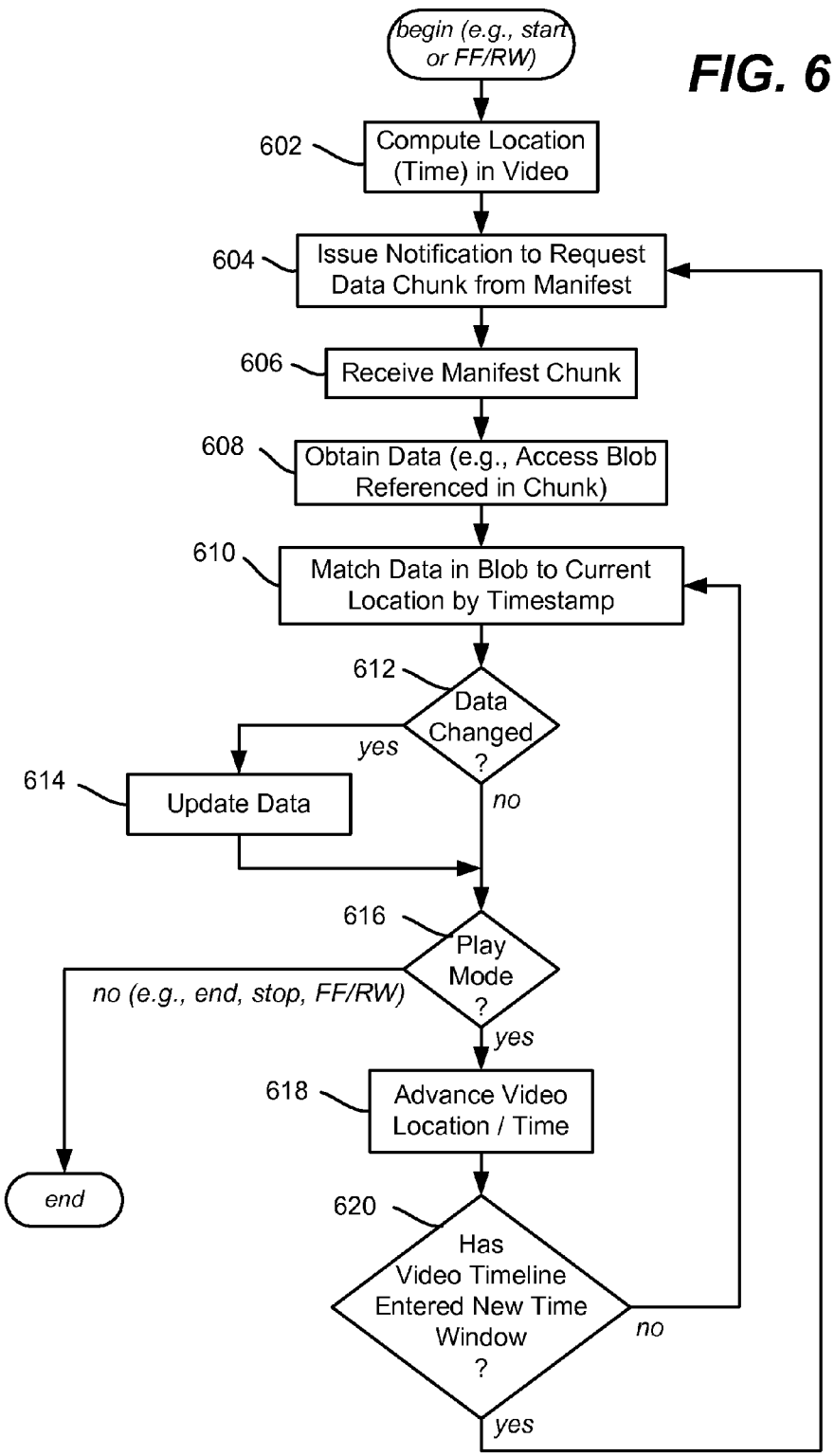
FIG. 6 is a flow diagram representing example steps that may be taken to obtain metadata for use in accessing event-related data for video stream synchronization, according to one or more example embodiments.

FIG. 6 summarizes video device operations, beginning at step 602 where the time/location in the in the video is computed. Initially, there is no chunk and thus step 604 requests the chunk corresponding to the computed location, which may be at the beginning. Step 606 receives the chunk.

At step 608, the data corresponding to the current chunk may be obtained (e.g., the blob accessed). Step 610 matches the data via the timestamp to the current video location. This may be on the video player device and/or the companion device(s). If the data has changed (step 612), then it is updated at step 614, e.g., presented to the user in conjunction with the current video location. Otherwise the previous data, if any, may remain presented for viewing (although it may be cleared after a time duration if unchanged too long).

Via step 616, the process continues as long as the user remains in play mode, e.g., the user does not stop/pause the video, the video has not ended, the location is not changed via fast forward (FF) or rewind (RW), and so on. If continuing in play mode, step 618 represents advancing the video/timeline.

Step 620 represents checking whether the video timeline has entered into a new time window, e.g., the next chunk in the manifest. If so, a new data chunk is requested from the data encoding service manifest, e.g., by returning to step 604. If not, the process returns to step 608 to see if updated data is associated with the new video location/timeline.

Note that if the video exits play mode at step 616, the steps of FIG. 6 may be repeated from the location at which the user resumes playing the video. In a pause situation (not explicitly shown), instead of repeating the steps from the beginning, step 616 may wait for a play event (thereafter continuing via the "yes" branch to step 618) or a non-play event (thereafter taking the "no" branch of step 616, repeating the example steps of FIG. 6 if a new location is reached.

Turning to another aspect, namely a fan voting example (referred to herein as occurring as part of "discreet mode"), consider that similar to the synchronized fight statistics example, there is a video that is being encoded from a live broadcast. However, instead of synchronizing live statistical data, the technology overlays a voting screen onto the broadcast/outputs voting to a companion device that may be in response to what has just happened in the video, or what is about to happen (e.g., a poll taken before a fight starts). A general goal is to avoid a scenario where some other important information is covered up, or that users are bothered with a vote that has nothing to do with what they are now watching.

Unlike the synchronized fight statistics example, in most instances a voting question only is asked occasionally. Thus, the data service is configured to differentiate between continuous mode data that is output for access to synchronize with video played at any time and discreet mode data that is output only occasionally. Data entry with respect to the discreet mode encodes data only at the time that has been specified; if a user joins a live video after that time, the user does not receive any previous discreet mode data. However, in one or more implementations, if the user rewinds, for example, any previous discreet mode data is received at the same place in the video as if the user was watching the event live/in real time or near real time. Similarly, if the user pauses and then later starts playing the video, any discreet mode data is received at the appropriate place in the video.

As can be seen, one or more aspects are directed towards outputting data in synchronization with a outputting a video stream, in which the video stream and data are received from external sources that are separate from one another. This may include determining a location within the video stream, sending a request based on the location for information corresponding to the data, and receiving the information comprising the data or a reference to the data. In one or more implementations, outputting the data comprises displaying a representation of the data on at least one companion device, and/or displaying a representation of the data on a device that also plays video corresponding to the video stream.

The information may be received as a chunk of a manifest, in which the chunk is based upon the location. The data for the current location may be based upon information in the chunk, e.g., accessing the data may comprise retrieving a data blob via a URL of identified in the chunk; (note that instead of a reference to the data, the actual data itself may be provided). The data may be output based upon a synchronization marker associated with the data and the location within the video stream, e.g., the data may be time-stamped with the synchronization marker.

In one or more implementations, a data service obtains event-related data that is generated in conjunction with streaming video of an event, stamps the event-related data with a synchronization marker, and outputs synchronization-marked data that corresponds to the event-related data for access. A data encoding service communicates with the data service to obtain information corresponding to the event-related data and maintain a manifest based upon the information. The data encoding service also returns at least part of the manifest in response to a request for manifest content, in which the manifest content provides information by which the synchronization-marked data is accessible for use in synchronizing with streamed video content based upon one or more synchronization markers in the synchronization-marked data. The synchronization-marked data may be contained within one or more data blobs, with at least one data blob accessible via a URL identified in the manifest content.

A video playing device may communicate with the data encoding service to request the manifest content in conjunction with streamed video played by the video playing device. A companion device may communicate with the video playing device, including to receive information by which the synchronization-marked data is accessible, whereby the companion device downloads the synchronization-marked data and displays a representation of the synchronization-marked data.

One or more aspects are directed towards synchronizing event-related data from one source with streaming video from another source, including marking the event-related data with synchronization markers that correspond to locations in the streaming video. Metadata that identifies the event-related data is provided to a consumer, which facilitates access to the event-related data marked with synchronization markers based upon information in the metadata. Some event-related data may be output for synchronizing with a substantially live video stream, but not configured for synchronizing with a video stream that is not substantially live.

Example Operating Environment

It can be readily appreciated that the above-described implementation and its alternatives may be implemented on any suitable computing device, including a gaming system, personal computer, tablet, DVR, set-top box, smart television, smartphone and/or the like. Combinations of such devices are also feasible when multiple such devices are linked together. For purposes of description, a gaming (including media) system is described as one exemplary operating environment hereinafter.

Figure 7:
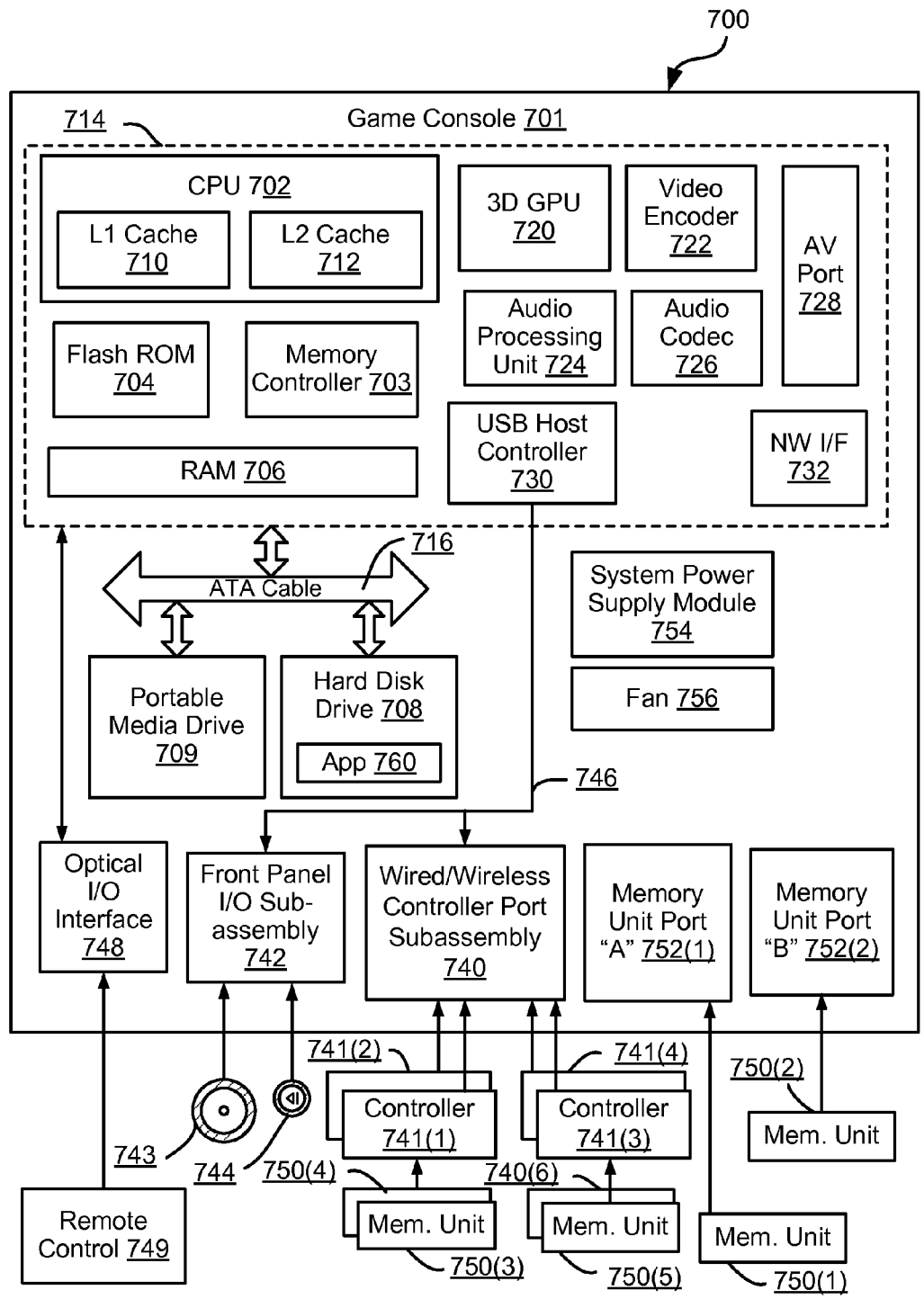
FIG. 7 is a block diagram representing an exemplary non-limiting computing system or operating environment, in the form of a gaming/media system (e.g., console/entertainment device), into which one or more aspects of various embodiments described herein can be implemented.

FIG. 7 is a functional block diagram of an example gaming and media system 700 and shows functional components in more detail. Console 701 has a central processing unit (CPU) 702, and a memory controller 703 that facilitates processor access to various types of memory, including a flash Read Only Memory (ROM) 704, a Random Access Memory (RAM) 706, a hard disk drive 708, and portable media drive 709. In one implementation, the CPU 702 includes a level 1 cache 710, and a level 2 cache 712 to temporarily store data and hence reduce the number of memory access cycles made to the hard drive, thereby improving processing speed and throughput.

The CPU 702, the memory controller 703, and various memory devices are interconnected via one or more buses (not shown). The details of the bus that is used in this implementation are not particularly relevant to understanding the subject matter of interest being discussed herein. However, it will be understood that such a bus may include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 702, the memory controller 703, the ROM 704, and the RAM 706 are integrated onto a common module 714. In this implementation, the ROM 704 is configured as a flash ROM that is connected to the memory controller 703 via a Peripheral Component Interconnect (PCI) bus or the like and a ROM bus or the like (neither of which are shown). The RAM 706 may be configured as multiple Double Data Rate Synchronous Dynamic RAM (DDR SDRAM) modules that are independently controlled by the memory controller 703 via separate buses (not shown). The hard disk drive 708 and the portable media drive 709 are shown connected to the memory controller 703 via the PCI bus and an AT Attachment (ATA) bus 716. However, in other implementations, dedicated data bus structures of different types can also be applied in the alternative.

A three-dimensional graphics processing unit 720 and a video encoder 722 form a video processing pipeline for high speed and high resolution (e.g., High Definition) graphics processing. Data are carried from the graphics processing unit 720 to the video encoder 722 via a digital video bus (not shown). An audio processing unit 724 and an audio codec (coder/decoder) 726 form a corresponding audio processing pipeline for multi-channel audio processing of various digital audio formats. Audio data are carried between the audio processing unit 724 and the audio codec 726 via a communication link (not shown). The video and audio processing pipelines output data to an A/V (audio/video) port 728 for transmission to a television or other display/speakers. In the illustrated implementation, the video and audio processing components 720, 722, 724, 726 and 728 are mounted on the module 714.

FIG. 7 shows the module 714 including a USB host controller 730 and a network interface (NW I/F) 732, which may include wired and/or wireless components. The USB host controller 730 is shown in communication with the CPU 702 and the memory controller 703 via a bus (e.g., PCI bus) and serves as host for peripheral controllers 734. The network interface 732 provides access to a network (e.g., Internet, home network, etc.) and may be any of a wide variety of various wire or wireless interface components including an Ethernet card or interface module, a modem, a Bluetooth module, a cable modem, and the like.

In the example implementation depicted in FIG. 7, the console 701 includes a controller support subassembly 740, for supporting four game controllers 741(1)-741(4). The controller support subassembly 740 includes any hardware and software components needed to support wired and/or wireless operation with an external control device, such as for example, a media and game controller. A front panel I/O subassembly 742 supports the multiple functionalities of a power button 743, an eject button 744, as well as any other buttons and any LEDs (light emitting diodes) or other indicators exposed on the outer surface of the console 701. The subassemblies 740 and 742 are in communication with the module 714 via one or more cable assemblies 746 or the like. In other implementations, the console 701 can include additional controller subassemblies. The illustrated implementation also shows an optical I/O interface 748 that is configured to send and receive signals (e.g., from a remote control 749) that can be communicated to the module 714.

Memory units (MUs) 750(1) and 750(2) are illustrated as being connectable to MU ports "A" 752(1) and "B" 752(2), respectively. Each MU 750 offers additional storage on which games, game parameters, and other data may be stored. In some implementations, the other data can include one or more of a digital game component, an executable gaming application, an instruction set for expanding a gaming application, and a media file. When inserted into the console 701, each MU 750 can be accessed by the memory controller 703.

A system power supply module 754 provides power to the components of the gaming system 700. A fan 756 cools the circuitry within the console 701.

An application 760 comprising machine instructions is typically stored on the hard disk drive 708. When the console 701 is powered on, various portions of the application 760 are loaded into the RAM 706, and/or the caches 710 and 712, for execution on the CPU 702. In general, the application 760 can include one or more program modules for performing various display functions, such as controlling dialog screens for presentation on a display (e.g., high definition monitor), controlling transactions based on user inputs and controlling data transmission and reception between the console 701 and externally connected devices.

The gaming system 700 may be operated as a standalone system by connecting the system to high definition monitor, a television, a video projector, or other display device. In this standalone mode, the gaming system 700 enables one or more players to play games, or enjoy digital media, e.g., by watching movies, or listening to music. However, with the integration of broadband connectivity made available through the network interface 732, gaming system 700 may further be operated as a participating component in a larger network gaming community or system.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
receiving a video stream from a video source;
separating the video stream into a plurality of time windows;
upon playing the video stream, determine that the video stream has entered a first time window;
requesting, from a data source separate from the video source, at least one data manifest chunk associated with the first time window, the at least one data manifest chunk
comprising event data that is marked with synchronization markers that correspond to a plurality of locations in the video stream;
determining that a first location of the plurality of locations in the video stream has been reached;
based on the determination that the first location in the video stream has been reached, identifying a first set of the event data that corresponds to the first location;
altering the first set of event data prior to providing access to the first set of event data based on a determination that a second set of event related data has not been provided; and
outputting the altered first set of the event data in synchronization with outputting the video stream at the first location of the video stream.

2. The method of claim 1, wherein the at least one data manifest chunk comprises a plurality of data manifest chunks, respective ones of the plurality of data manifest chunks being associated with respective event data.

3. The method of claim 2, further comprising accessing the first set of the event data for the location within the video stream based upon information in the at least one data manifest chunk.

4. The method of claim 3, wherein accessing the first set of the event data comprises retrieving a data blob via a Uniform Resource Locator identified in the at least one data manifest chunk.

5. The method of claim 3, further comprising outputting the altered first set of the event data based upon a synchronization marker associated with the first location of the plurality of locations within the video stream.

6. The method of claim 5, further comprising stamping the first set of the event data with the synchronization marker in which the synchronization marker comprises a timestamp.

7. The method of claim 1, wherein outputting the first set of the event data comprises displaying a representation of the altered first set of the event data on at least one companion device.

8. The method of claim 1, wherein outputting the altered first set of the event data comprises displaying a representation of the altered first set of the event data on a device that also plays video corresponding to the video stream.

9. The method of claim 1, further comprising:
determining a new location within the video stream that is not a location associated with the at least one data manifest chunk;
sending a request based on the new location within the video stream for information corresponding to the first set of the event data; and
receiving the information comprising the first set of the event data or a reference to the first set of the event data in another data manifest chunk.

10. The method of claim 1, wherein the video stream is a live video stream feed being played in real time.

11. The method of claim 1, wherein the second set of event related data is associated with a second location in the video stream that is prior to the first location in the video stream.

12. A system comprising:
a data service, the data service configured to:
obtain event-related data that is generated in conjunction with streaming video of an event;
stamp the event-related data with a synchronization marker;
altering the first set of event data prior to providing access to the event related data based on a determination that other event related data has not been provided; and
output synchronization-marked data that corresponds to the altered event-related data for access; and
a data encoding service, the data encoding service configured to:
communicate with the data service to obtain information corresponding to the altered event-related data;
maintain a manifest based upon the information; and
return at least part of the manifest in response to a request for manifest content, in which the manifest content provides information by which the synchronization-marked data is accessible for use in synchronizing with streamed video content based upon one or more synchronization markers in the synchronization-marked data.

13. The system of claim 12, wherein the synchronization-marked data is contained within one or more data blobs, with at least one data blob accessible via a Uniform Resource Locator identified in the manifest content.

14. The system of claim 12, wherein the data service is further configured to differentiate between continuous mode data and discreet mode data.

15. The system of claim 12, further comprising a video playing device configured to communicate with the data encoding service to request the manifest content in conjunction with streamed video played by the video playing device.

16. The system of claim 15, further comprising a companion device configured to:
communicate with the video playing device;
receive information by which the synchronization-marked data is accessible download the synchronization-marked data; and
display a representation of the synchronization-marked data.

17. The system of claim 12, wherein the data service is configured to obtain the event-related data from a data storage that maintains the event-related data separately from the streaming video.

18. The system of claim 12, wherein the manifest is configured as a plurality of chunks divided by time.

19. One or more machine-readable storage devices having executable instructions for synchronizing event-related data from a data source with streaming video from a video source, the executable instructions cause one or more processors to perform operations comprising:
marking the event-related data with synchronization markers that correspond to locations in the streaming video;
determining that the video stream has reached a particular point in time in the video stream;
requesting, from the data source, at least one data manifest chunk associated with the particular point in time, the at least one data manifest chunk comprising a portion of the event-related data, the portion of the event related data being marked with a synchronization marker associated with the particular point in time in the video stream;
altering the event related data prior to providing access to the portion of the event related data based on a determination that another portion of the event related data has not been provided; and
providing access to the altered portion of the event-related data marked with the synchronization markers.

20. The one or more machine-readable storage devices of claim 19 having further executable instructions that cause the one or more processors to perform an operation comprising outputting at least some discreet mode data.

* * * * *